(12) United States Patent
Westacott et al.

(10) Patent No.: US 9,951,574 B2
(45) Date of Patent: Apr. 24, 2018

(54) CLEANING AND SEPARATING FLUID AND DEBRIS FROM CORE SAMPLES AND CORING SYSTEMS

(71) Applicant: Halliburton Energy Services, Inc., Houston, TX (US)

(72) Inventors: Donald Clifford Westacott, Spring, TX (US); Matthew L. Lee, Tomball, TX (US)

(73) Assignee: Halliburton Energy Services, Inc., Houston, TX (US)

(*) Notice: Subject to any disclaimer, the term of this patent is extended or adjusted under 35 U.S.C. 154(b) by 133 days.

(21) Appl. No.: 14/899,065

(22) PCT Filed: Jul. 30, 2015

(86) PCT No.: PCT/US2015/042874
§ 371 (c)(1),
(2) Date: Dec. 16, 2015

(87) PCT Pub. No.: WO2016/022383
PCT Pub. Date: Feb. 11, 2016

(65) Prior Publication Data
US 2016/0376861 A1    Dec. 29, 2016

Related U.S. Application Data

(60) Provisional application No. 62/034,319, filed on Aug. 7, 2014.

(51) Int. Cl.
*E21B 25/02* (2006.01)
*E21B 25/10* (2006.01)
(Continued)

(52) U.S. Cl.
CPC ............. *E21B 25/10* (2013.01); *C09K 8/00* (2013.01); *E21B 25/02* (2013.01); *E21B 49/06* (2013.01); *E02D 2300/00* (2013.01)

(58) Field of Classification Search
CPC . C09K 8/00; E21B 25/02; E21B 25/10; E21B 49/06
See application file for complete search history.

(56) References Cited

U.S. PATENT DOCUMENTS 2,264,449 A * 12/1941 Mounce ................. E21B 25/08
175/233
4,479,557 A    10/1984 Park et al.
(Continued)

FOREIGN PATENT DOCUMENTS

WO    2013101695 A2    7/2013
WO    2016022383 A1    2/2016

OTHER PUBLICATIONS

Alan, McFall, Recent Developments in Pressure Coring, Jan. 1980, Sandia Laboratories, SAND80-0253C.*
(Continued)

*Primary Examiner* — Nicole Coy
*Assistant Examiner* — Dany E Akakpo
(74) *Attorney, Agent, or Firm* — McDermott Will & Emery LLP

(57) ABSTRACT

Coring tools including a core tube assembly; a carrier chamber defined within the core tube assembly for storing one or more core samples drilled from a downhole formation having a wellbore fluid therein, wherein the wellbore fluid has a wellbore fluid density; a non-hydrocarbon, non-reactive heavy weight fluid ("HWF") present within the carrier chamber, the HWF exhibiting a HWF density of about 2 pounds per gallon greater than the wellbore fluid density; a pressure housing cover selectively rotatable between (1) an open position, where the one or more core samples are able to be inserted into the carrier chamber, and (2) a closed position, where the carrier chamber is sealed; and a cover activation mechanism coupled to the core tube assembly and
(Continued)

operable to move the pressure housing cover between the closed position and the open position.

20 Claims, 8 Drawing Sheets

(51) Int. Cl.
*E21B 49/06* (2006.01)
*C09K 8/00* (2006.01)

(56) References Cited

U.S. PATENT DOCUMENTS

| | | |
|---|---|---|
| 4,502,553 A | 3/1985 | Park et al. |
| 5,360,074 A | 11/1994 | Collee et al. |
| 5,546,798 A | 8/1996 | Collee et al. |
| 2001/0000393 A1 | 4/2001 | Collee et al. |
| 2002/0129937 A1 | 9/2002 | Cravatte |
| 2014/0090893 A1 | 4/2014 | Reid et al. |
| 2015/0144344 A1* | 5/2015 | Mazyar .................. E21B 43/24 166/302 |

OTHER PUBLICATIONS

International Search Report and Written Opinion for PCT/US2015/042874 dated Oct. 21, 2015.
Extended European Search Report from European Patent Application No. 15829400.9, dated Jan. 4, 2018, 9 pages.

* cited by examiner

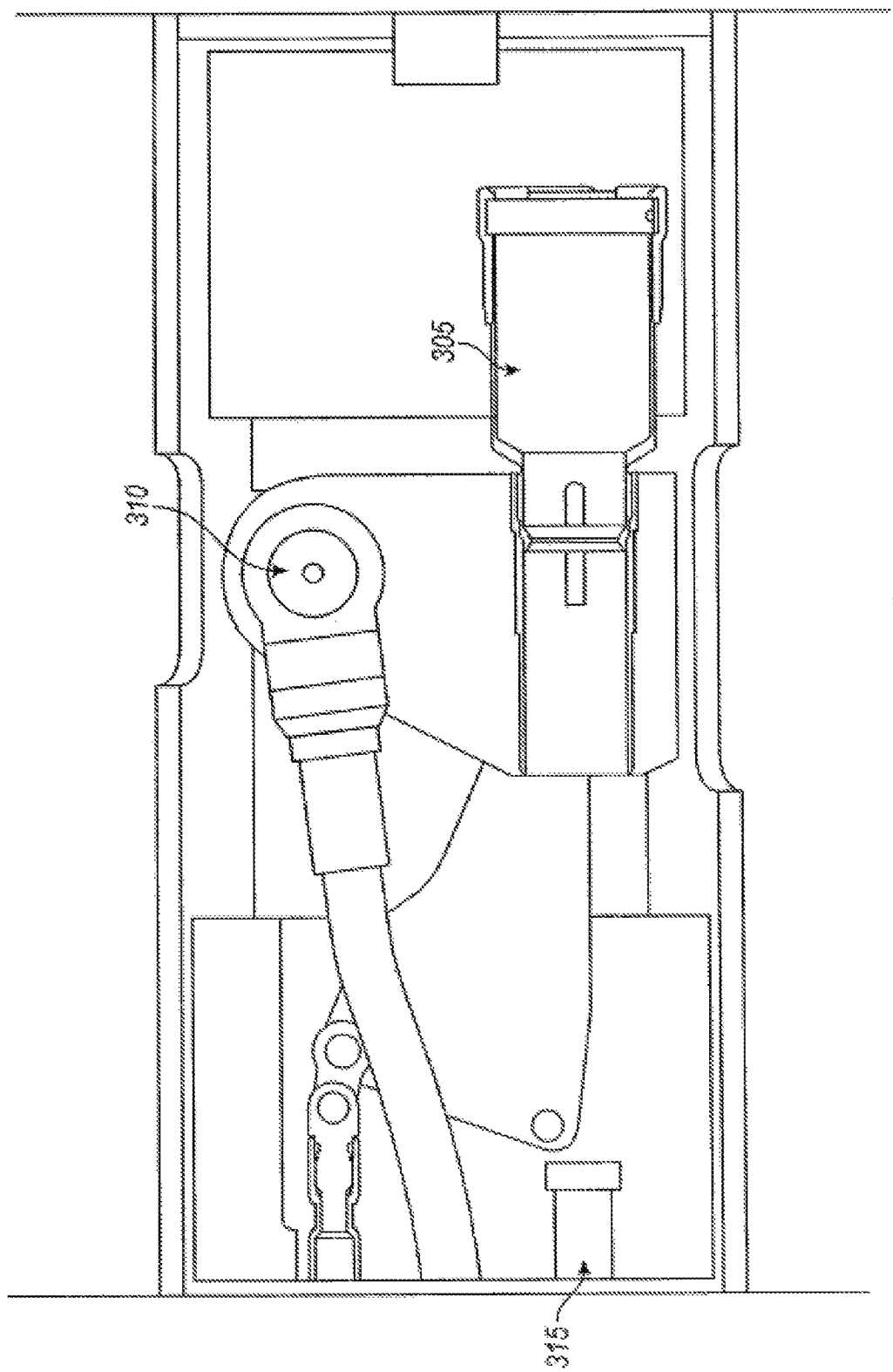

CLEANING AND SEPARATING FLUID AND DEBRIS FROM CORE SAMPLES AND CORING SYSTEMS

CROSS-REFERENCE TO RELATED APPLICATIONS

This application claims priority to Provisional U.S. Application 62/034,319, entitled "Method to Clean and Separate Fluid and Debris from Core Samples and Coring Systems" and filed on Aug. 7, 2014.

BACKGROUND

The present disclosure relates to the collection of core samples and, more particularly, to cleaning and separating fluid and debris from collected core samples and core systems.

For many years, geologists in the oil and gas exploration industry have taken and analyzed rock samples of potential hydrocarbon-producing subterranean formations as part of their efforts to determine the profitability of completing wells from which the core samples are taken, as well as the desirability of further exploratory drilling in the same area. Once a formation of interest is reached in a drilled well, drillers often investigate the formation and the deposits therein by obtaining and analyzing such samples. Each representative sample is generally cored from the formation using a hollow coring bit, and the sample obtained using this method is generally referred to as a core sample.

Once the core sample has been transported to the surface, it may be analyzed to assess, among other purposes, the reservoir storage capacity (porosity), the flow potential (permeability) of the rock material that makes up the formation, the chemical and mineral composition of the mineral deposits residing in the pores of the formation, and the irreducible water content of the rock material. The information gleaned from analysis of the sample is used to design and implement well completion; that is, to selectively produce certain economically attractive treatment intervals from among those accessible by the well. Upon deciding on a well completion plan, all intervals except those specifically targeted for production are isolated from the target interval, and the deposits within the targeted interval are selectively produced through the well.

In a typical coring operation, an annular cutter called a coring head is deployed on the end of a tool string. The coring head is operable to remove an annular volume of material to create a core, which may then be captured and placed in a collection tube and subsequently retrieved to surface for analysis. In some coring applications, drilling fluid and debris within a wellbore (e.g., rock fragments from the wellbore wall) can fall into the core sample collection tube or chamber. This debris can contaminate the core sample, resulting in skewed testing results once received at the surface and analyzed. It also may cause the core collection chamber to become choked, which, among other things, may result in inability to obtain the requisite or maximum number of samples which may be recovered with a particular coring tool.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 3A, 3B, and 3C are cut-away views of the core-drilling portion of an example sidewall drilling tool.

DETAILED DESCRIPTION

Figure 1:
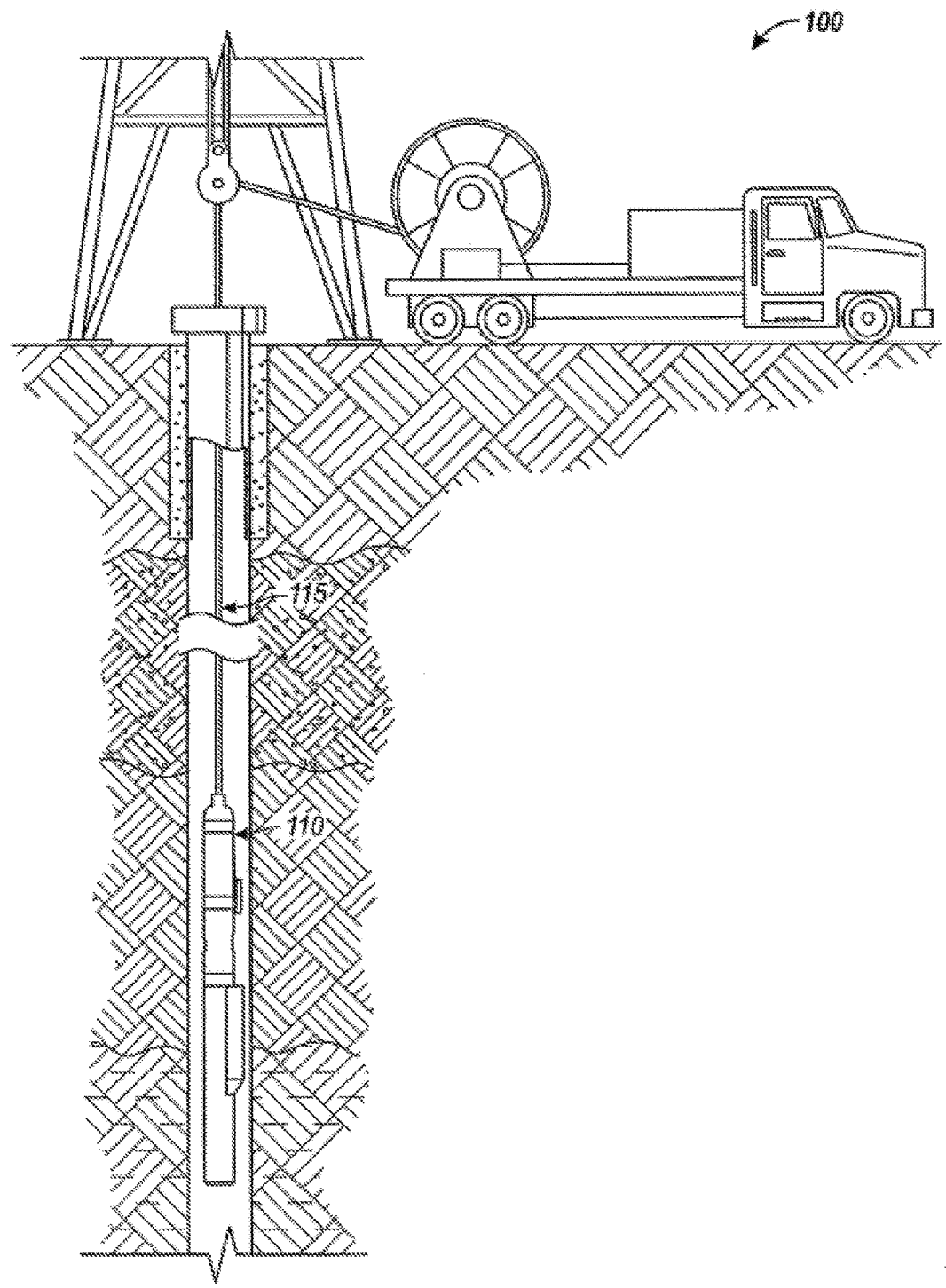
FIG. 1 is an example wireline implementation of the present disclosure.

The present disclosure relates to the collection of core samples and, more particularly, to cleaning and separating fluid and debris from collected core samples and core systems.

The embodiments described herein discuss providing a clean environment for core sample collection, as well as providing a reliable way to seal and maintain downhole pressures in a core collection tube of a coring tool. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented in which the coring tool is made suitable for testing, retrieval and sampling along sections of the formation. Embodiments may be implemented with various samplers that, for example, may be conveyed through flow passage in tubular string or conveyance, such as using a wireline, slickline, coiled tubing, downhole robot (tractor), or the like. The system described herein may be suited for use with the Hostile Rotary Sidewall Coring Tool (HRSCT-B) available from Halliburton Energy Services of Houston, Tex., for example. The method described herein may be used in one or more of wireline, measurement-while-drilling (MWD) and logging-while-drilling (LWD) operations. One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein.

At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

FIG. 1 shows an example system 100 that may employ the principles of the present disclosure. In FIG. 1, a coring tool 110 is placed in a wellbore by a wireline 115. In certain example embodiments, the coring tool 110 is placed in the wellbore by any conveyance, such as those discussed above (e.g., wired coil tubing) that is connectable to the surface. In other embodiments, the coring tool 110 may be placed in the wellbore as part of a measurement while drilling (MWD) portion of a drill string or as part of a logging while drilling (LWD) portion of a drill string. In yet other embodiments, the coring tool 110 may be coupled to drill pipe as part of a wired drill pipe system.

Figure 2:
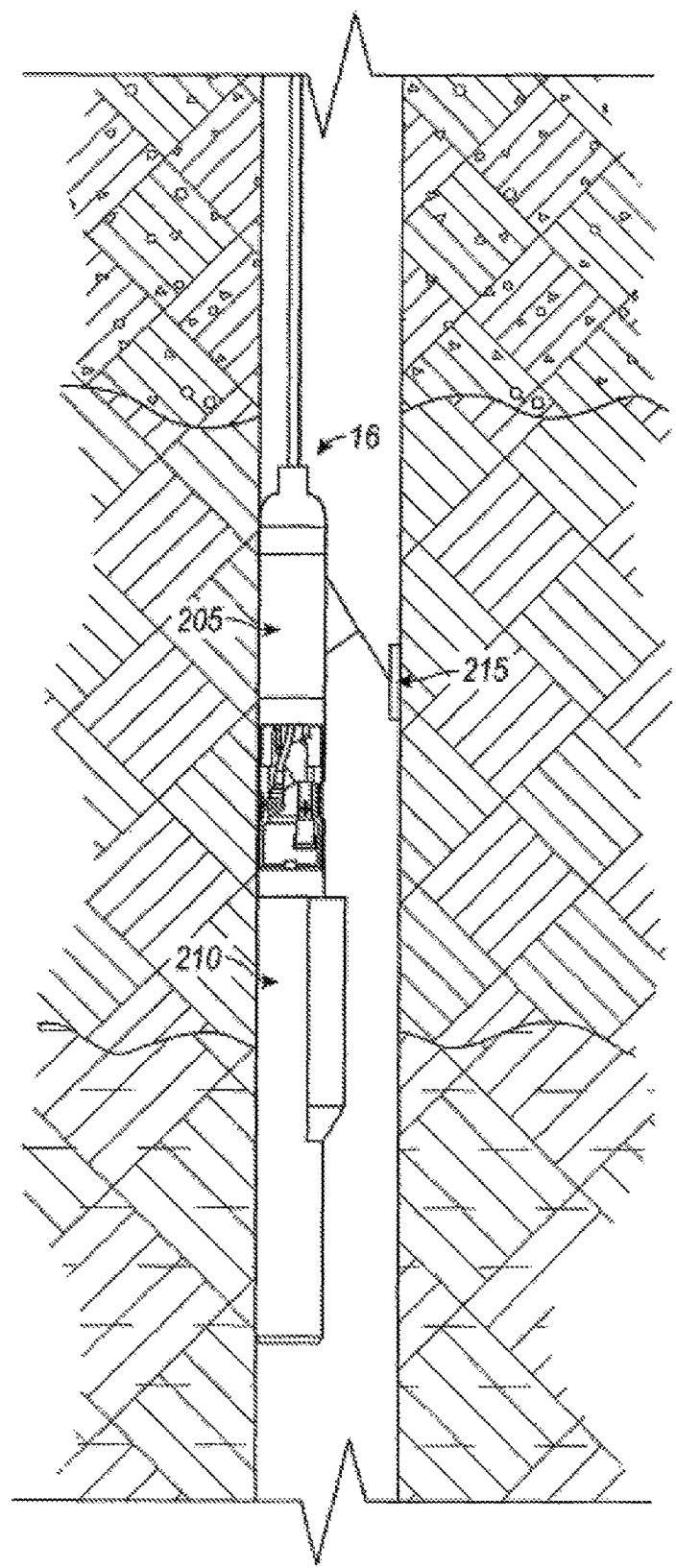
FIG. 2 is an example implementation of the tools of the present disclosure at a downhole location.

FIG. 2 shows a side view of a coring tool 16, which may be substantially similar to the coring tool 110 of FIG. 1, lowered to a depth of interest within the wellbore. As illustrated, the coring tool 16 includes a sidewall drilling tool 205 and a high pressure core module 210. Once the coring tool 110 reaches a region of interest, the sidewall drilling tool 205 may be configured to extend a stabilizing pad 215 to engage the wall of the wellbore and then rotate to face the wellbore wall for obtaining a sidewall core therefrom.

Figure 3B:
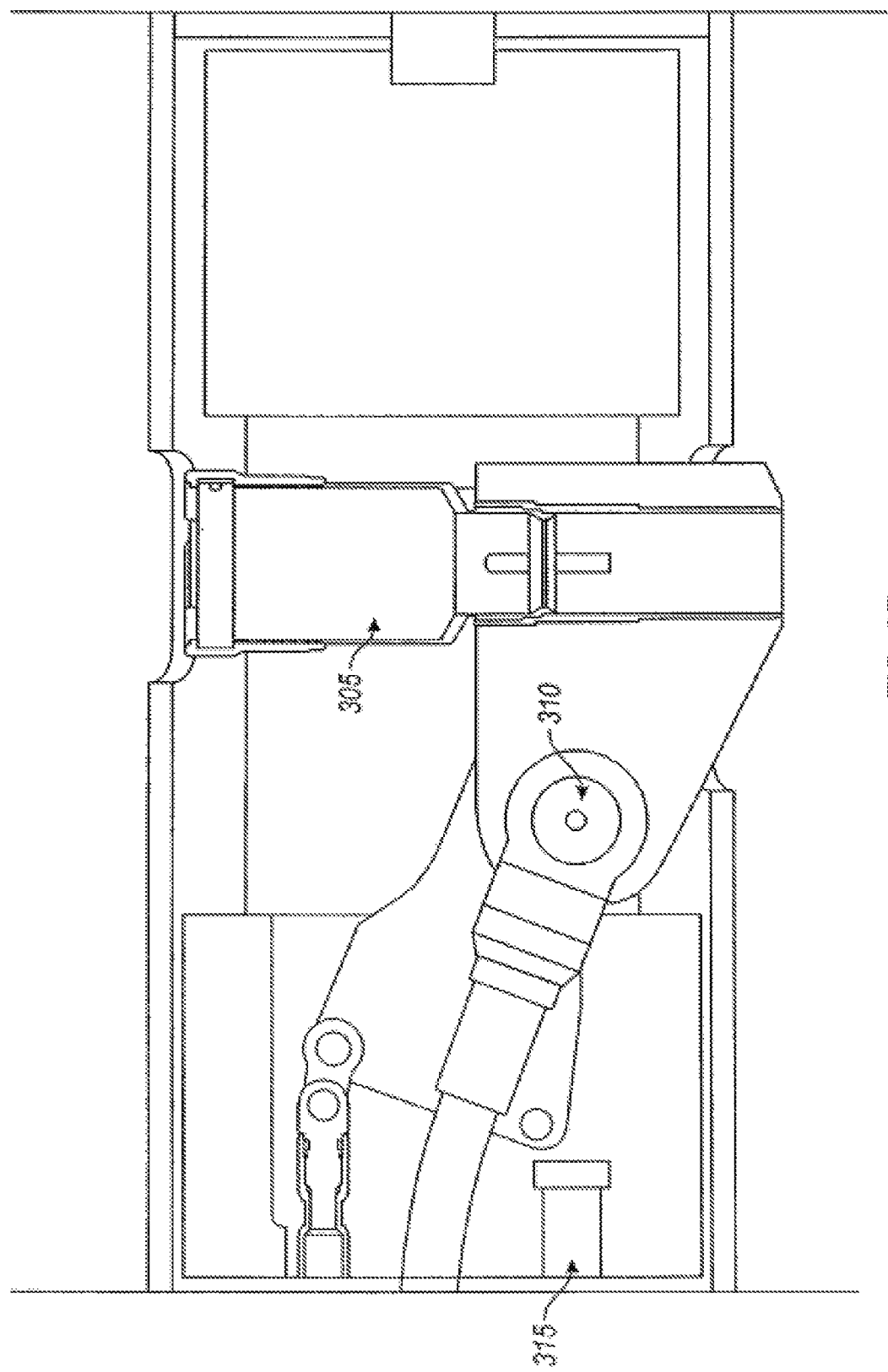
Figure 3C:
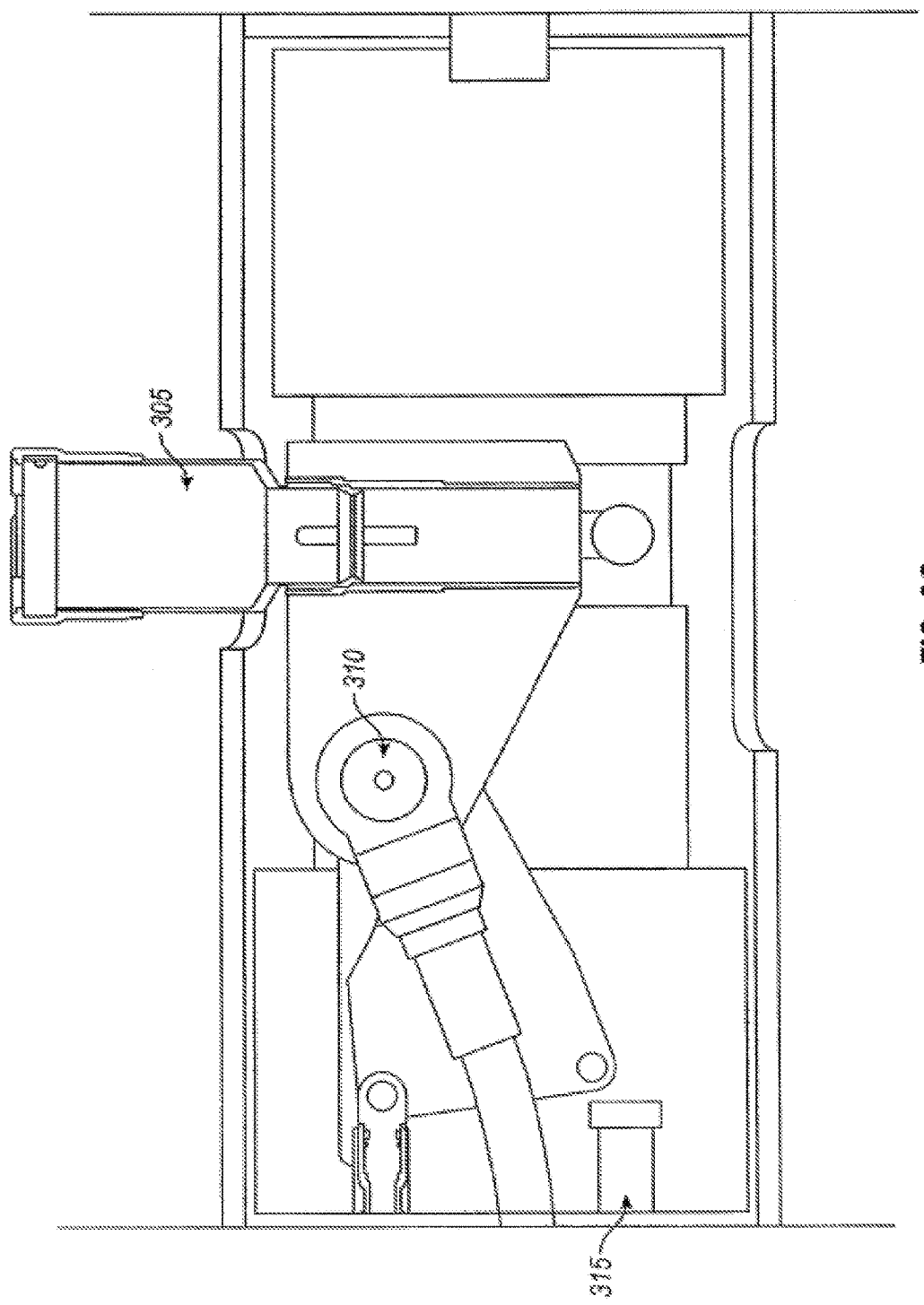

FIGS. 3A-3C show an enlarged view of a core-drilling portion of the sidewall drilling tool 205. As illustrated, the core-drilling portion may include a coring bit 305 to be forced into a formation and collect a core sample. Certain example coring bits 305 include a finger in the coring head to retain a sample. The example core-drilling portion may include a bell crank 310 that allows the coring bit 305 to be rotated into position. As shown in FIGS. 3A-3C the coring bit 305 may be rotated while it is moved into engagement with the wall of the wellbore. In certain embodiments, a core sample may be cut from the wellbore until the coring bit 305 has reached a maximum displacement into the wellbore wall. In certain implementations, a sharp lateral translation of the coring bit 305 or the sidewall drilling tool 205 itself will break the core sample free from the wellbore wall.

In certain implementations, the sequence of FIGS. 3A-3C may be reversed as the coring bit 305 is retracted back into the sidewall drilling tool 205 and then rotated parallel to the sidewall drilling tool 205. In certain embodiments, the resulting core sample may be aligned with the high-pressure core module 210. The core sample may be pushed into the core receiver of the high-pressure core module 210 by, for example, a plunger 315.

Figure 4:
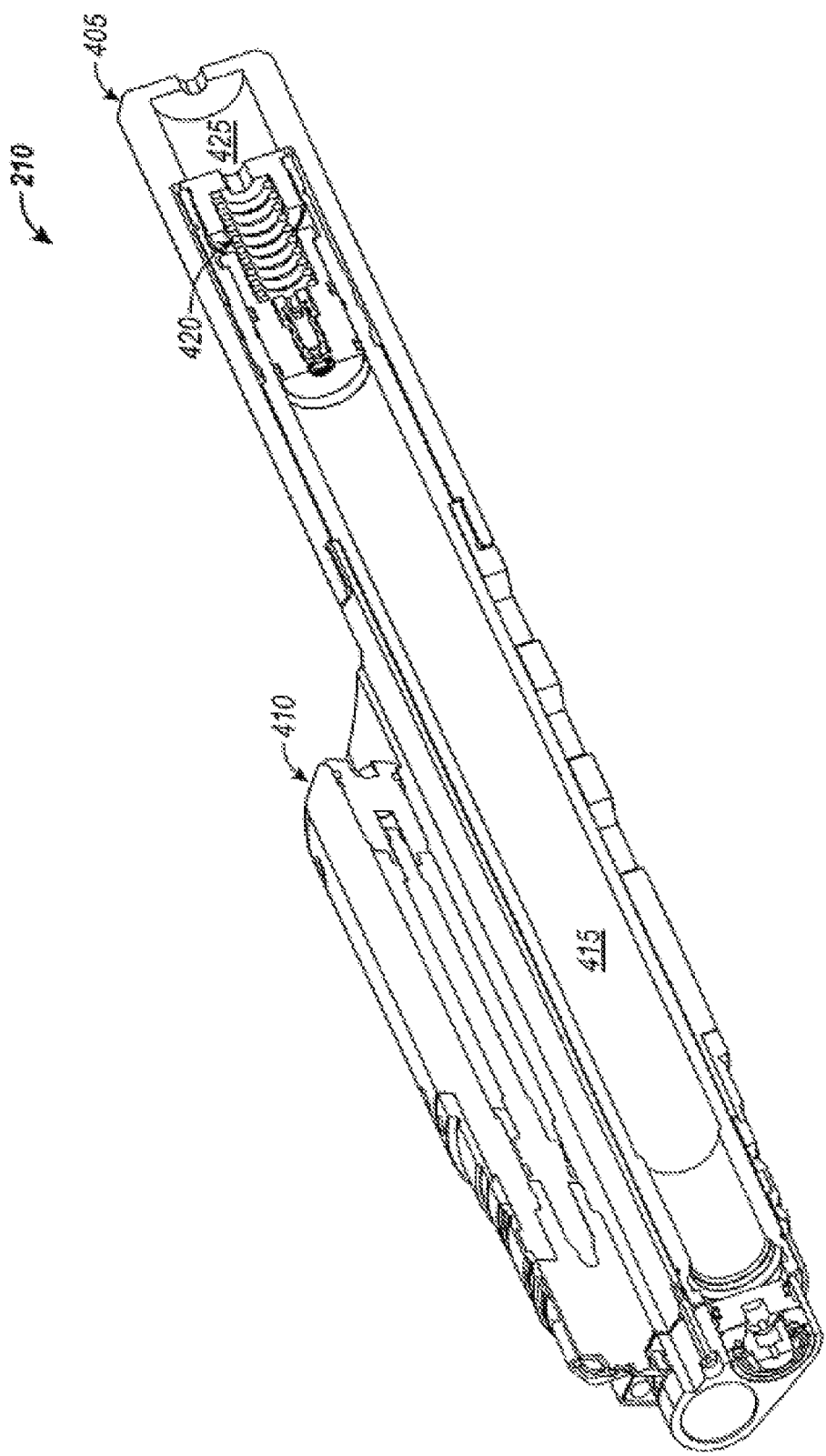
FIG. 4 is a cut-away view of an example high-pressure core module, according to the present disclosure.

FIG. 4 shows a partial cross-sectional view of an example high-pressure core module 210. The high-pressure core module 210 includes a high-pressure core tube assembly 405, which, in turn, includes a carrier chamber 415 to store one or a plurality of core samples. According to the present disclosure, prior to deploying the high-pressure core module 210 into the wellbore, the carrier chamber 415 may be at least partially filled with a non-hydrocarbon and non-reactive heavy weight fluid, as discussed in detail below.

The high-pressure core tube assembly 405 may further include a cover activation mechanism 410 used to open and close the opening to the carrier chamber 415. The high-pressure core module 210 may be a standalone assembly for use with an existing sidewall coring tool. The high-pressure core module 210 may be configured to store the sample core(s) after they are retrieved from the formation by a sidewall coring tool, such as the sidewall drilling tool 205. The sample cores are stored within the carrier chamber 415 of the high-pressure core module 210. In one example embodiment, the sidewall drilling coring tool 205 may be a hostile rotary sidewall coring tool (HRSCT).

Figure 5:
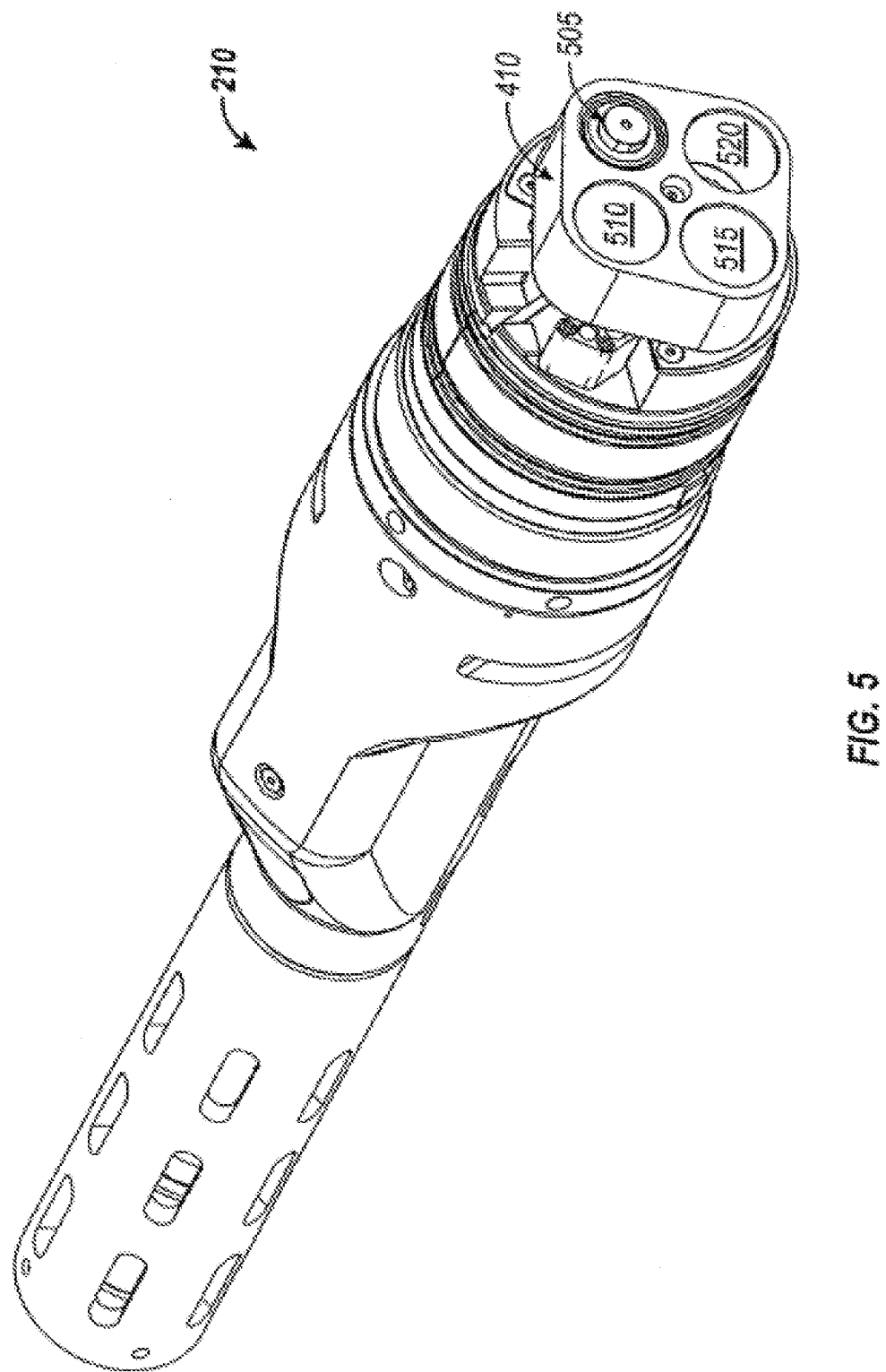
FIG. 5 is an elevation view of an example high-pressure core module according to the present disclosure.

Turning to FIG. 5, an example cover activation mechanism 410 is shown from outside the tool. The cover activation mechanism 410 may be actuated to place one of a cover 505 or the contents of one of chambers 510, 515, or 520 in front of the high-pressure core module 210. The chambers 510, 515, and 520 may include one or more of isolator plugs, packaging film, or other items for preserving core samples.

In exemplary operation, when a coring tool (e.g., the coring tool 110 of FIG. 1) is in the sample coring mode, the cover activation mechanism 410 rotates the cover to an open position, which allows a core sample to be deposited or otherwise inserted into the carrier chamber 415 of the high-pressure core module 210. As a core sample is inserted into the carrier chamber 415, a portion of the non-hydrocarbon and non-reactive heavy weight fluid present within the carrier chamber 415 is displaced and otherwise squeezed around the core sample and out of the carrier chamber 415. The density of the non-hydrocarbon, non-reactive heavy weight fluid ("HWF") is designed to be greater than the density of the wellbore fluids, including any drilling fluid, flush fluid, and the like (collectively "wellbore fluids") that may be present therein. Accordingly, any wellbore fluids that may be present within the wellbore may be separated from the core sample as it is inserted into the carrier chamber 415 due to the presence of the HWF. Moreover, displacing the HWF around the core sample may further prove advantageous in flushing away undesired wellbore debris that may be attached to the outer surface of the core sample(s). As a result, the fluid may further serve to clean the core samples as they are inserted into the carrier chamber 415

The HWF is comprised of at least a non-hydrocarbon, non-reactive base fluid (or simply "base fluid" herein). The base fluid may be a brine comprising a salt and an aqueous fluid. The aqueous fluid may be fresh water, deionized water, spring water, mineral water, or any combination thereof. Generally, the aqueous fluid (i.e., water) may be from any source, provided that it does not contain components that might adversely affect the characteristics and/or performance (e.g., the density) of the HWF described herein.

Suitable salts for forming the brine base fluid may include any salt capable of achieving the desired density and separation effects described herein. It is desirable that the salt selected achieves a base fluid that is compatible with the formation rock of the wellbore in which the core sample is being taken (e.g., that it is non-reactive therewith). For example, a base fluid that does not cause the core sample to swell or otherwise lose its integrity or react to form toxic gasses or other undesired reaction products is desirable. It may further be desirable that the salt selected achieves a base fluid that is resistant to causing corrosion of the coring tool, and/or that is acceptable in terms of health, safety, and the environment. In at least one embodiment, the salt may be cesium bromate, cesium formate, calcium bromide, potassium formate, sodium bromide, potassium bromide, and any combination thereof, thereby forming a brine base fluid with the aqueous fluid previously discussed.

In some embodiments, the HWF has a density of about 2 pounds per gallon ("ppg") greater than the density of a wellbore fluid to achieve the desired wellbore fluid separation and cleaning results described according to the embodiments herein. For example, when drilling fluid is present in the wellbore, the density of the HWF is at least about 2 ppg greater than the density of the drilling fluid. In some embodiments, the HWF has a density in the range of about 12 ppg to about 22 ppg (based on the typical density of drilling fluids), encompassing any value and subset therebetween. For example, in some embodiments, the HWF has a density in the range of about 12 ppg to about 14.5 ppg, or about 14.5 ppg to about 17 ppg, or about 17 ppg to about 19.5 ppg, or about 19.5 ppg to about 22 ppg, encompassing any value or subset therebetween. Each of these values is critical to the embodiments of the present disclosure and may depend on a number of factors including, but not limited to, the base fluid selected for forming the HWF, the density of the wellbore fluid within the wellbore to be separated from the collected core samples, any additives included in the HWF, and the like, and any combination thereof. For example, in some embodiments, the base fluid is a brine cesium formate base fluid and the density is preferably about or exactly 19.2 ppg. As another example, the base fluid selected may be a brine calcium bromide base fluid and the density is preferably about or exactly 14.2 ppg.

Generally, the salt, including any of those listed above, for forming at least a portion of the HWF is in the range of about 25% to about 90% by weight of the aqueous fluid portion of the HWF, encompassing any value and subset therebetween. For example, the salt may form at least a portion of the HWF in the range of about 25% to about 38%, or about 38% to about 51%, or about 51% to about 64%, or about 64% to about 77%, or about 77% to about 90%, encompassing any value and subset therebetween. Each of these values is critical to the embodiments of the present disclosure and may depend on a number of factors including, but not limited to, the type of salt selected, the type of aqueous fluid selected, the desired density, the compatibility of the salt with the rock formation, any included additives, and the like, and any combination thereof.

The HWF may further be adjusted for viscosity to further enhance separation and removal of wellbore fluids from the carrier chamber 415 (FIG. 4). The viscosity may desirably be in the range of about 1 centipoise (cP) to about 2500 cP, encompassing any value and subset therebetween. For example, the viscosity may be in the range of about 1 cP to about 5 cP, or about 5 cP to about 50 cP, or about 50 cP to about 500 cP, or about 500 cP to about 1000 cP, or about 1000 cP to about 1500 cP, or about 1500 cP to about 2000 cP, to about 2000 cP to about 2500 cP, encompassing any value and subset therebetween. Each of these values is critical to the embodiments of the present disclosure and may depend on a number of factors including, but not limited to, the wellbore fluid present in the wellbore, the components of the HWF selected, the desired density of the HWF, and the like, and any combination thereof. The viscosity may be adjusted by a viscosifier including a gelling agent, a gas in combination with a foaming agent, and any combination thereof.

The gelling agent may be a naturally-occurring polymer, a synthetic polymer, and any combination thereof. For example, suitable gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. For example, the gelling agent may be guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, an acrylamide dimethylaminoethyl methacrylamide, dimethylaminopropyl methacrylamide, partially hydrolyzed polyacrylamide, and the like), an acrylate (e.g., dimethylaminoethyl methacrylate, dimethylethyl acrylate, quaternized dimethylaminoethylacrylate, quaternized dimethylaminoethylmethacrylate, and the like), and any combination thereof.

Suitable gases for use as the viscosifier in the presence of a foaming agent according to the embodiments described herein may include, but are not limited to, nitrogen, carbon dioxide, air, helium, argon, and any combination thereof. The selection of the particular gas may depend on a number of factors including the type of formation being treated, any reactivity of the gas with the formation or a material forming the coring tool, the desired density of the HWF and any effect on the density that the gas may have, and the like, and any combination thereof. By way of non-limiting example, carbon dioxide gasses have greater density than nitrogen gasses.

The foaming agent for use with the gas when both are used to increase the viscosity of the HWF may include, but is not limited to, cationic foaming agents, anionic foaming agents, amphoteric foaming agents, nonionic foaming agents, or any combination thereof. Non-limiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof.

In some embodiments, the pH of the HWF may be desirably adjusted to achieve compatibility with the rock formation, to ensure non-reactivity with the rock formation and/or the coring tool, and the like. In some embodiments, accordingly it may be desirable to adjust the pH higher or lower. Generally, the desirable pH for the HWF described herein is in the range of about 6 to about 10, encompassing any value and subset therebetween. For example, the pH may be about 6, about 7, about 8, about 9, or about 10, encompassing any value and subset therebetween. These values represent a range in which the HWF is expected to be non-reactive and each is critical to the embodiments of the present disclosure, depending on a number of factors including, but not limited to, the type of rock formation in which the core sample is being collected, any effect that the pH has on the density of the HWF, the selected base fluid for forming the HWF, and the like, and any combination thereof.

The pH of the HWF may be adjusted using a pH adjusting agent, which may be an acidic or basic chemical or compound. Examples of suitable pH adjusting agents may include, but are not limited to, hydrochloric acid, sodium carbonate, sodium bicarbonate, sodium hydroxide, formic acid, magnesium oxide, sulfuric acid, and the like, and any combination thereof.

The HWF of the present disclosure may further include an additive including, but not limited to, a weighting agent, an inert solid, an emulsifier, a dispersion aid, a corrosion inhibitor, a surfactant, a particulate, a breaker, a biocide, a scale inhibitor, a gas hydrate inhibitor, a friction reducer, a clay stabilizing agent, and any combination thereof.

Referring again to FIG. 4 and FIG. 5, after each core sample is drilled and deposited in the carrier chamber 415, the cover activation mechanism 410 rotates the cover back to the closed position. Once in the closed position, if the push rod command is activated, the push rod can install a plug 505 through the cover into the high-pressure carrier chamber 415. The plug 505 may maintain the pressure of the high-pressure carrier chamber 415, for example, while it is brought to the surface and transported to a laboratory for testing. Plugging the high-pressure carrier chamber 415 maintains the pressure of the core samples while the high-pressure core module 210 is brought to the surface. For example, the pressure within the high-pressure carrier chamber 415 may be maintained at or near in-situ pressure for the core samples. Once on the surface, the carrier chamber 415 can be removed from the larger assembly and shipped to the lab for further evaluation and testing.

Certain example implementations of the high-pressure core tube assembly 210 may maintain both the pressure and the temperature of a core sample. In these implementations, gases within the core sample may be kept in solution after the high-pressure carrier chamber 415 is brought to the surface.

In some implementations, the bottom of the carrier chamber 415 may be fitted with a piston 420, which is compressed as core samples are loaded into the sample tube. In one embodiment, as a core sample is loaded, the high-pressure core tube assembly 405 is secured on top and the piston 420 is energized to maintain an axial load on the core samples. In certain implementations, the piston 420 is a traveling piston or a floating piston. In such an implementation, an axial load is maintained on the core samples as they are brought to the surface from the pressure maintained by the travel piston.

Figure 6:
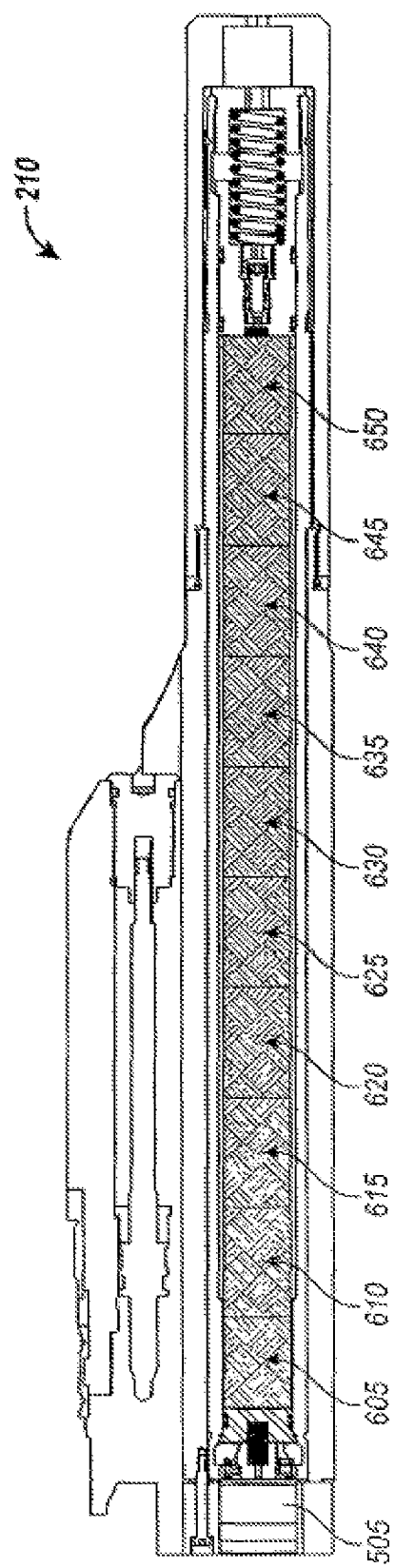
FIG. 6 is a partial cross-sectional side view of the high-pressure core tube assembly with core samples present therein.

FIG. 6 shows a partial cross-sectional side view of the high-pressure core tube assembly 205, where the carrier chamber 415 is filled with sampled cores 605-650 and a cap 505 has been fitted over carrier chamber 415.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include Embodiment A, Embodiment B, and Embodiment C:

Embodiment A: A coring tool, comprising: a core tube assembly; a carrier chamber defined within the core tube assembly for storing one or more core samples drilled from a downhole formation having a wellbore fluid therein, wherein the wellbore fluid has a wellbore fluid density; a non-hydrocarbon, non-reactive heavy weight fluid ("HWF") present within the carrier chamber, the HWF exhibiting a HWF density of about 2 pounds per gallon greater than the wellbore fluid density; a pressure housing cover selectively rotatable between (1) an open position, where the one or more core samples are able to be inserted into the carrier chamber, and (2) a closed position, where the carrier chamber is sealed; and a cover activation mechanism coupled to the core tube assembly and operable to move the pressure housing cover between the closed position and the open position.

Embodiment B: A method, comprising: introducing a coring tool into a wellbore having a wellbore fluid therein, wherein the wellbore fluid has a wellbore fluid density, and wherein the coring tool includes a core tube assembly that defines a carrier chamber, the carrier chamber having present therein a non-hydrocarbon, non-reactive heavy weight fluid ("HWF") that exhibits a HWF density of about 2 pounds per gallon greater than the wellbore fluid density; conveying the coring tool to a desired location within the wellbore; cutting one or more core samples from a sidewall of the wellbore at the desired location; inserting the one or more core samples into the carrier chamber; displacing at least a portion of the HWF from the carrier chamber as the one or more core samples are inserted into the carrier chamber; plugging the core tube assembly to maintain a pressure therein; and retrieving the coring tool to the surface.

Embodiment C: A system comprising: a wellbore in a subterranean formation, the wellbore having a wellbore fluid therein with a wellbore fluid density; and a coring tool capable of being disposed in the wellbore at a desired location, the coring tool comprising: a core tube assembly; a carrier chamber defined within the core tube assembly for storing one or more core samples drilled from a downhole formation having a wellbore fluid therein, wherein the wellbore fluid has a wellbore fluid density; a non-hydrocarbon, non-reactive heavy weight fluid ("HWF") present within the carrier chamber, the HWF exhibiting a HWF density of about 2 pounds per gallon greater than the wellbore fluid density; a pressure housing cover selectively rotatable between (1) an open position, where the one or more core samples are able to be inserted into the carrier chamber, and (2) a closed position, where the carrier chamber is sealed; and a cover activation mechanism coupled to the core tube assembly and operable to move the pressure housing cover between the closed position and the open position.

Embodiments A, B, and C may have one or more of the following additional elements in any combination:

Element 1: Wherein the HWF density is in the range of 2 pounds per gallon to 22 pounds per gallon.

Element 2: Wherein the HWF comprises an aqueous fluid and a salt.

Element 3: Wherein the HWF comprises an aqueous fluid and a salt selected from the group consisting of cesium bromate, cesium formate, calcium bromide, potassium formate, sodium bromide, potassium bromide, and any combination thereof.

Element 4: Wherein the HWF comprises an aqueous fluid and a salt present in the range of about 25% to about 90% by weight of the aqueous fluid.

Element 5: Wherein the HWF further comprises a viscosifier and the HWF has a viscosity in the range of about 1 centipoise to about 2500 centipoise.

Element 6: Wherein the HWF further comprises a pH adjusting agent and the HWF has a pH in the range of about 6 to about 10.

Element 7: Wherein the coring tool further comprises a piston at the bottom of the carrier chamber to maintain an axial load on the one or more core samples in the carrier chamber.

Element 8: Wherein the coring tool is conveyed into a desired location, one or more core samples is cut from a sidewall of the wellbore and inserted into the carrier chamber, and at least a portion of the HWF is displaced from the carrier chamber, wherein such displacement comprises separating the one or more core samples from a wellbore fluid.

Element 9: Wherein the coring tool is conveyed into a desired location, one or more core samples is cut from a sidewall of the wellbore and inserted into the carrier chamber, and at least a portion of the HWF is displaced from the carrier chamber, wherein such displacement comprises flushing away wellbore debris attached to an outer surface of the one or more core samples with the HWF as the one or more core samples are inserted into the carrier chamber.

By way of non-limiting example, exemplary combinations of the above elements, which combinations are applicable to Embodiments A, B, and C, include: 1, 4, and 9; 1, 2, 3, and 8; 3, 6, 7, and 9; 1, 2, 3, 4, 5, 6, 7, 8, and 9; 2, 5, and 7; 3, 5, 6, 7, and 9; 4 and 6; 3 and 5; and the like.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A coring tool, comprising:
  a core tube assembly;
  a carrier chamber defined within the core tube assembly for storing one or more core samples drilled from a downhole formation the downhill formation comprising a wellbone, wherein a wellbore fluid having a wellbone fluid density is present in the downhole formation at a time when the one or more core samples are drilled from the downhole formation;
  a non-hydrocarbon, non-reactive heavy weight fluid ("HWF") present within the carrier chamber, the HWF exhibiting a HWF density of about 2 pounds per gallon greater than the wellbore fluid density, wherein, upon insertion of a core sample into the carrier chamber, the HWF having a density of about 2 pounds per gallon greater than the wellbore fluid density enables a portion of the HWF to be displaced around the core sample and out of the carrier chamber, thereby separating the wellbore fluid from the core sample and flushing away wellbore debris attached to an outer surface of the core sample;
  a pressure housing cover selectively rotatable between (1) an open position, where the one or more core samples are able to be inserted into the carrier chamber, and (2) a closed position, where the carrier chamber is sealed; and
  a cover activation mechanism coupled to the core tube assembly and operable to move the pressure housing cover between the closed position and the open position.

2. The coring tool of claim 1, wherein the HWF density is in the range of 2 pounds per gallon to 22 pounds per gallon.

3. The coring tool of claim 1, wherein the HWF comprises an aqueous fluid and a salt.

4. The coring tool of claim 1, wherein the HWF comprises an aqueous fluid and a salt selected from the group consisting of cesium bromate, cesium formate, calcium bromide, potassium formate, sodium bromide, potassium bromide, and any combination thereof.

5. The coring tool of claim 1, wherein the HWF comprises an aqueous fluid and a salt present in the range of about 25% to about 90% by weight of the aqueous fluid.

6. The coring tool of claim 1, wherein the HWF further comprises a viscosifier and the HWF has a viscosity in the range of about 1 centipoise to about 2500 centipoise.

7. The coring tool of claim 1, wherein the HWF further comprises a pH adjusting agent and the HWF has a pH in the range of about 6 to about 10.

8. The coring tool of claim 1, further comprising a piston at the bottom of the carrier chamber to maintain an axial load on the one or more core samples in the carrier chamber.

9. A method, comprising:
introducing a coring tool into a wellbore having a wellbore fluid therein, wherein the wellbore fluid has a wellbore fluid density, and wherein the coring tool includes a core tube assembly that defines a carrier chamber, the carrier chamber having present therein a non-hydrocarbon, non-reactive heavy weight fluid ("HWF") that exhibits a HWF density of about 2 pounds per gallon greater than the wellbore fluid density;
conveying the coring tool to a desired location within the wellbore;
cutting one or more core samples from a sidewall of the wellbore at the desired location;
inserting the one or more core samples into the carrier chamber;
displacing at least a portion of the HWF around the one or more core samples and out of the carrier chamber as the one or more core samples are inserted into the carrier chamber, wherein the HWF having a density of about 2 pounds per gallon greater than the wellbore fluid density enables a portion of the HWF to be displaced around the one or more core samples and out of the carrier chamber, thereby separating the wellbore fluid from the one or more core samples and flushing away wellbore debris attached to an outer surface of the one or more core samples;
plugging the core tube assembly to maintain a pressure therein; and
retrieving the coring tool to the surface.

10. The method of claim 9, wherein displacing at least the portion of the HWF from the carrier chamber comprises separating the one or more core samples from the wellbore fluid.

11. The method of claim 9, wherein displacing at least the portion of the HWF from the carrier chamber comprises flushing away wellbore debris attached to an outer surface of the one or more core samples with the HWF as the one or more core samples are inserted into the carrier chamber.

12. The method of claim 9, wherein the HWF density is in the range of 2pounds per gallon to 22 pounds per gallon.

13. The method of claim 9, wherein the HWF comprises an aqueous fluid and a salt.

14. The method of claim 9, wherein the HWF comprises an aqueous fluid and a salt selected from the group consisting of cesium bromate, cesium formate, calcium bromide, potassium formate, sodium bromide, potassium bromide, and any combination thereof.

15. The method of claim 9, wherein the HWF comprises an aqueous fluid and a salt present in the range of about 25% to about 90% by weight of the aqueous fluid.

16. The method of claim 9, wherein the HWF further comprises a viscosifier and the HWF has a viscosity in the range of about 1 centipoise to about 2500 centipoise.

17. The method of claim 9, wherein the HWF further comprises a pH adjusting agent and the HWF has a pH in the range of about 6 to about 10.

18. A system comprising:
a wellbore in a subterranean formation, the wellbore having a wellbore fluid therein with a wellbore fluid density; and
a coring tool capable of being disposed in the wellbore at a desired location, the coring tool comprising:
a core tube assembly;
a carrier chamber defined within the core tube assembly for storing one or more core samples drilled from a downhole formation, the downhole formation comprising a wellbone, wherein a wellbore fluid having a wellbore fluid density is present in the downhole formation at a time when the one or more core samples are drilled from the downhole formation;
a non-hydrocarbon, non-reactive heavy weight fluid ("HWF") present within the carrier chamber, the HWF exhibiting a HWF density of about 2 pounds per gallon greater than the wellbore fluid density, wherein, upon insertion of a core sample into the carrier chamber, the HWF having a density of about 2 pounds per gallon greater than the wellbore fluid density enables a portion of the HWF to be displaced around the core sample and out of the carrier chamber, thereby separating the wellbore fluid from the core sample and flushing away wellbore debris attached to an outer surface of the core sample;
a pressure housing cover selectively rotatable between (1) an open position, where the one or more core samples are able to be inserted into the carrier chamber, and (2) a closed position, where the carrier chamber is sealed; and
a cover activation mechanism coupled to the core tube assembly and operable to move the pressure housing cover between the closed position and the open position.

19. The system of claim 18, wherein the HWF density is in the range of 2 pounds per gallon to 22 pounds per gallon.

20. The system of claim 18, wherein the HWF comprises an aqueous fluid and a salt selected from the group consisting of cesium bromate, cesium formate, calcium bromide, potassium formate, sodium bromide, potassium bromide, and any combination thereof.

* * * * *